US012597100B2

(12) United States Patent
Iglesias Navarro et al.

(10) Patent No.: US 12,597,100 B2
(45) Date of Patent: Apr. 7, 2026

(54) DEEP IMAGE DELIGHTING

(71) Applicant: DISNEY ENTERPRISES, INC.,
Burbank, CA (US)

(72) Inventors: Santiago Iglesias Navarro, Palma de
Mallorca (ES); **Pablo Pernías Pascual
de Pobil**, San Juan de Alicante (ES);
Robert B. Moore, Clermont, FL (US);
David N. Juboor, Johnson City, TN
(US)

(73) Assignee: DISNEY ENTERPRISES, INC.

( * ) Notice: Subject to any disclaimer, the term of this
patent is extended or adjusted under 35
U.S.C. 154(b) by 149 days.

(21) Appl. No.: 18/419,942

(22) Filed: Jan. 23, 2024

(65) Prior Publication Data

US 2025/0238898 A1     Jul. 24, 2025

(51) Int. Cl.
G06T 5/50          (2006.01)
G06T 5/77          (2024.01)

(52) U.S. Cl.
CPC .................. G06T 5/50 (2013.01); G06T 5/77
(2024.01); *G06T 2207/20081* (2013.01); *G06T*
*2207/20224* (2013.01)

(58) Field of Classification Search
CPC ... G06T 5/60; G06T 5/50; G06T 2207/20224;
G06T 5/77; G06T 2207/20081
See application file for complete search history.

(56) References Cited

U.S. PATENT DOCUMENTS

2022/0375045 A1* 11/2022 Wu ........................... G06T 5/20

OTHER PUBLICATIONS

Arizona Highways, "Halo Effect", Jul. 2, 2019, retrieved from
Wayback Machine https://web.archive.org/web/20190702052621/
https://www.arizonahighways.com/photography/photo-tips/halo-
effect (Year: 2019).*
Peng, "Light Source Relighting for Indoor Scene Photos with Deep
Neural Networks", May 18, 2020, Massachusetts Institute of Tech-
nology (Year: 2020).*

* cited by examiner

*Primary Examiner* — Kee M Tung
*Assistant Examiner* — Thang Gia Huynh
(74) *Attorney, Agent, or Firm* — Dorsey & Whitney LLP

(57) ABSTRACT

A method for content modification executed by a computer
including a processor and a memory includes receiving an
initial image that includes light emitted from a representa-
tion of a light source. The method further includes analyzing
the initial image, with a delighting model, to predict a
second image comprising negative light of the initial image.
The method further includes subtracting pixel values of the
predicted second image comprising negative light of the
initial image from pixel values of the initial image. The
method further includes outputting a third image comprising
the initial image without the emitted light from the repre-
sentation of the light source. A second method includes
training a delighting model with the initial image with an
added predetermined light source and the predetermined
light source, to predict an image comprising negative light
of the initial image.

20 Claims, 6 Drawing Sheets

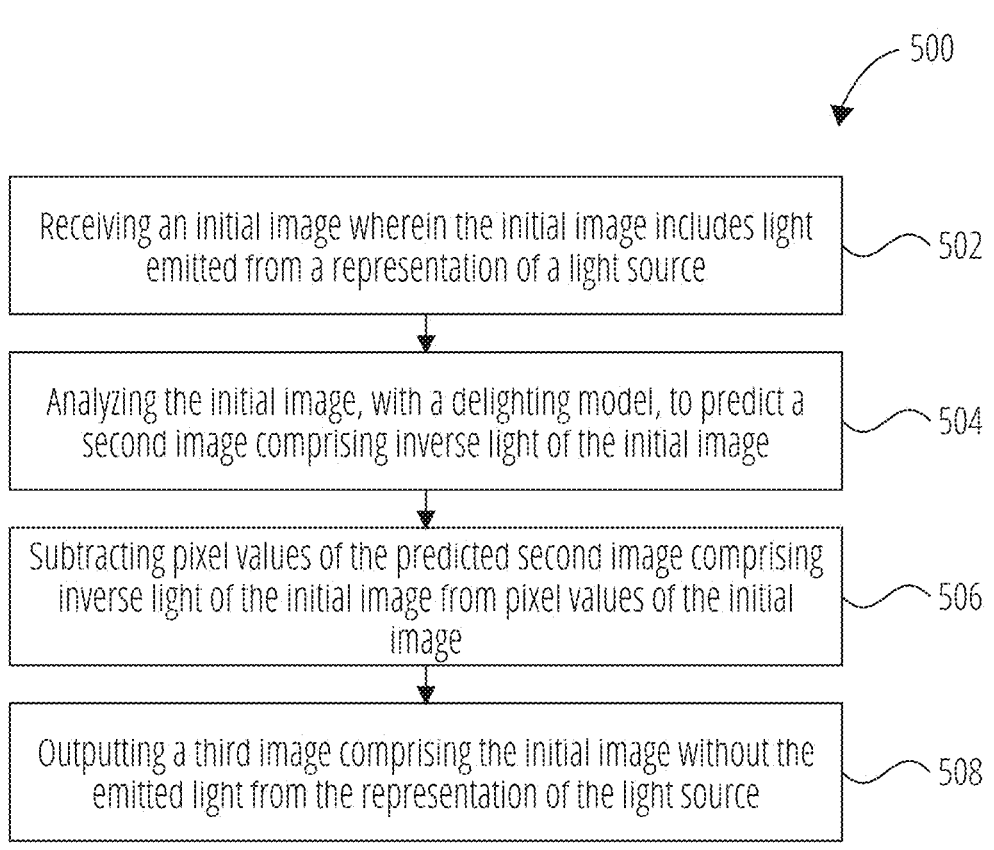

500

Receiving an initial image wherein the initial image includes light emitted from a representation of a light source —— 502

Analyzing the initial image, with a delighting model, to predict a second image comprising inverse light of the initial image —— 504

Subtracting pixel values of the predicted second image comprising inverse light of the initial image from pixel values of the initial image —— 506

Outputting a third image comprising the initial image without the emitted light from the representation of the light source —— 508

Receiving an initial image    602

Adding, to the initial image, a predetermined light source    604

Training a delighting model with the initial image with the added predetermined light source and the predetermined light source, to predict an image comprising inverse light of the initial image    606

Outputting the trained delighting model    608

DEEP IMAGE DELIGHTING

FIELD

The present disclosure relates generally to systems and methods for media content modification, for example, image editing.

BACKGROUND

Pictures are often captured in different lighting environments, including those with very bright and/or colored light sources (e.g., point light sources). In such cases, the light from such light sources can impact the overall content of the image, e.g., define a "halo" or "glow" around people, modify the hue of nearby objects or people, or otherwise brighten certain areas, which can obscure or adversely impact the aesthetic features of the image. For example, subjects or background objects may be modified by the light source.

Modifying or editing such images to remove a light source and/or light effects is difficult. For example, while a light source could be "dimmed" via conventional editing software, the environmental impact from the light source on the other aspects of the image will still be impacted adversely, e.g., may still include a colored effect or the like due to the light source reflecting off of the objects/subjects at the time of capture. Such light can create unwanted shadows, halo effects and other stray light of the sort that removes the realism and clarity of the image.

SUMMARY

In one embodiment, a method for content modification executed by a computer including a processor and a memory is disclosed. The method includes receiving an initial image wherein the initial image includes light emitted from a representation of a light source, analyzing the initial image, with a delighting model, to predict a second image including the light emitted from the representation of the light source, subtracting pixel values of the predicted second image including the light emitted from the representation of the light source from pixel values of the initial image, and outputting a third image including the initial image without the emitted light from the representation of the light source.

In another embodiment, a method for content modification executed by a computer including a processor and a memory is disclosed. The method includes receiving an initial image, adding, to the initial image, a predetermined light source, training a delighting model with the initial image including the added predetermined light source and the predetermined light source, to predict a negative light image including only light emitted from a light source, and outputting the trained delighting model.

BRIEF DESCRIPTION OF THE DRAWINGS

FIG. 5 illustrates a flowchart of a method for content modification.

SPECIFICATION

Figure 1:
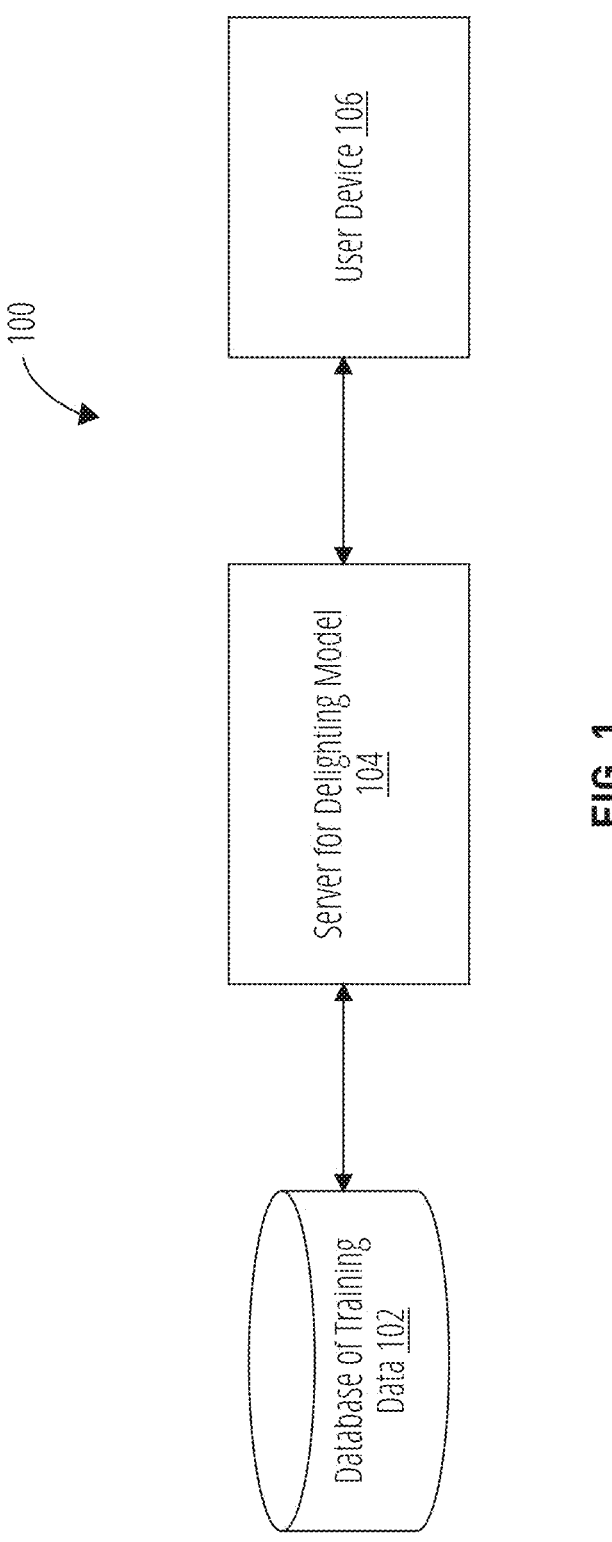
FIG. 1 illustrates an example of disclosure system for delighting content.

The present disclosure includes a method for delighting digital content, such as images or videos, without altering or modifying other content (e.g., subjects and backgrounds) within the original digital content. It should be understood that the terms "delight", "delighted" and "delighting" as used herein are meant to encompass removing light effects from one or more light sources, including the light source itself as well as consequential effects or features due to the emitted light from the light source, e.g., indirect reflections, lens flare, and/or occlusions from the light. It should be also understood that the term "light source" as used herein is meant to encompass light sources of all kinds including representations of light sources in images such as halo effects, lens flares, light reflections and other light waves that are deemed light source representations. For example, in some embodiments, a delighting model, which may be in the form of a machine learned model, an artificial intelligent model or any other similar technologies, is used to predict a negative light image including only light emitted from and reflected from the light source of the original image, e.g., the negative light image includes the impact and origination of a light source but does not include other objects, colors, etc. within the original image. The pixel values of the predicted negative light image are subtracted from the pixel values of the initial or original image to remove the light and its corresponding impact from the initial image, creating a delighted image that is otherwise unmodified (e.g., preserving content, textures, and colors within the image).

Optionally further processing can be done to re-light the image, such as to add in specific light effects that the user can control. In some examples, the user can add animated light effects to create an animated image or piece of digital content. Related, the process can be used for multiple images, such as multiple frames within a video, to delight video content. The delighting model may be trained using a variety of techniques. In one example, one or more original images without modification or any artificially added light sources (i.e., unlighted images) are collected, e.g., received from data stores or cameras, that in some cases are randomly collected. A lighting source or lighting pattern is introduced into the original e.g., a defined or known light source that is added digitally to create an image that mimics the original image but with lighting effects from the light source being emitted onto the subjects and/or backgrounds of the image (i.e., a lighted image). In this manner, the model may include an original image and a lighted image where the light is artificially added to the image or in some instances, light can be added in a physical environment where a first or original image is captured without the light source being activated and a second or lighted image is captured with the physical light source activated. In some instances, the model may be trained on data sets including both types of data.

In some cases, the lighted images may include various effects and light sources (e.g., multiple effects or sources may be added to each image or the images may include a single light source or effect). The delighting model analyzes an original image and a lighted image to be able to make correspondences and predictions regarding the impact of the light source on the images. Further, the delighting model is trained on a number of original images modified to create lighted images with the all types of varying types, position, and sizes of light sources increasing the accuracy of delighting images that the delighting model encounters when in use. For example, the delighting model is trained on original images and lighted images with a number of light sources (e.g., one, two, three, four, etc. light sources) with various backgrounds and a number of subjects. Therefore, the delighting model is able to delight a variety of images used as inputs into the delighting model. Moreover, delighting models trained in such a matter are better at delighting images with rare lighting effects that rarely occur within the lifetime use of the delighting model.

Turning now to the figures, FIG. 1 illustrates an example of a system 100 used to train and/or use a delighting model. The system 100 generally comprises training data 102 such as stored on one or more databases, the delighting model 104 (e.g., as hosted on a server or other computer or computer system) and a user device 106 (e.g., a computer, smart phone, tablet, or the like). As can be appreciated, the delighting model 104 may be hosted on one or more computers, servers, and/or locations and the example shown in FIG. 1 is illustrative. Similarly, although a single user device 106 is disclosed in many instances there may be multiple users devices 106 in communication with the delighting model 104. The database of training data 102 contains training data (e.g., original and lighted images, as well as the segmentation or location of the light source) to train the delighting model. The database of training data 102 can transmit the training data to the delighting model 104 for the delighting model to use and analyze. Training data sent to the delighting model 104 includes, for example, training data made up of original images and a lighted images. In some cases, the database of training data 102 receives data from the delighting model 104 where the transmitted data includes, for example, an image predicted using the delighting model trained on the training data received from the database of training data 102 for storage or for use in future training of the delighting model. For example, the predicted image can include only light emitted or reflected from the light source. In other examples, the training images may be discarded after use.

However, in other examples, the data set may not include "lighted images" but may apply the light sources during the analysis. For example, the training process may include receiving an original image, adding lights synthetically to the image, such as by saving the location and/or segments of the light sources (but not actually creating a "lighted image"). Using the synthetically added lights and the position, the model will then predict the negative of light for the image added using the locations/segments of the light sources. A loss function can then be determined and model weights adjusted based on the differences between removing the predicted negative light from the modified image and the original. In some examples, the light sources can be generated in real-time while training the model and separate images including the light sources may not need to be created. Further, in some embodiments, the model may not differentiate between reflected light from the halo and from the light source, allowing all light interference and effects to be predicted.

The delighting model 104 can remove light sources and light impact (e.g., delight) images received from the user device 106. The delighting model 104 receives images from the user device 106 (e.g., that were captured via a user device 106 such as a smartphone) and/or that are transferred to the user device 106. Additionally or alternatively, the delighting model 104 receives data corresponding to a location or a segmentation that identifies the light source and/or light effect that is to be removed as detected by other models. The images and/or data may be transferred between the delighting model and the user device 106 in various manners, including via means of wireless and/or wired communication between the two. In some cases, the delighting model 104 transmits the output of the delighting model to the user device 106. This includes a delighted image of the original image received from the user device 106, or a predicted image containing only the negative light of the original image used in post-processing to delight the original image. The delighting model 104 also receives training data from the database of training data 102. Training data received from the database of training data 102 includes, for example, training data made up of various original images and lighted images (e.g., images mirroring the original images but that have been modified to include a light source). The delighting model 104 is trained using the received training data from the database of training data 102 and is used to generate a negative light image that includes only light emitted or reflected from the light source that is used in post-processing to delight the original image, e.g., is a predicted impact image of the light source on the content of the image.

The user device 106 sends images to the delighting model 104 to be delighted. The images include, for example, images taken by a user containing various subjects and backgrounds with various light sources emitting various lighting effects, e.g., any type of image where a light source or light effects may be desired to be removed. The images can also already be stored on the user device 106 as they have been taken in the past or have been received via communication with other users. Additionally, in some cases, the images sent by the user device 106 to the delighting model 104 do not need a light source that needs to be removed by the delighting model, but rather contains various lighting effects desired to be removed such as lens flares and or light halos.

The user device 106 receives, from the delighting model 104, an image that is delighted or the generated predicted negative light image that includes only emitted light from light sources that may be used in post-processing to delight the original image. In other words, the user device 106 can receive a processed image that has been corrected via the predicted image output by the model or may receive the predicted image and further processing steps may be done on the user device, rather than within the delighted model 104.

Figure 2:
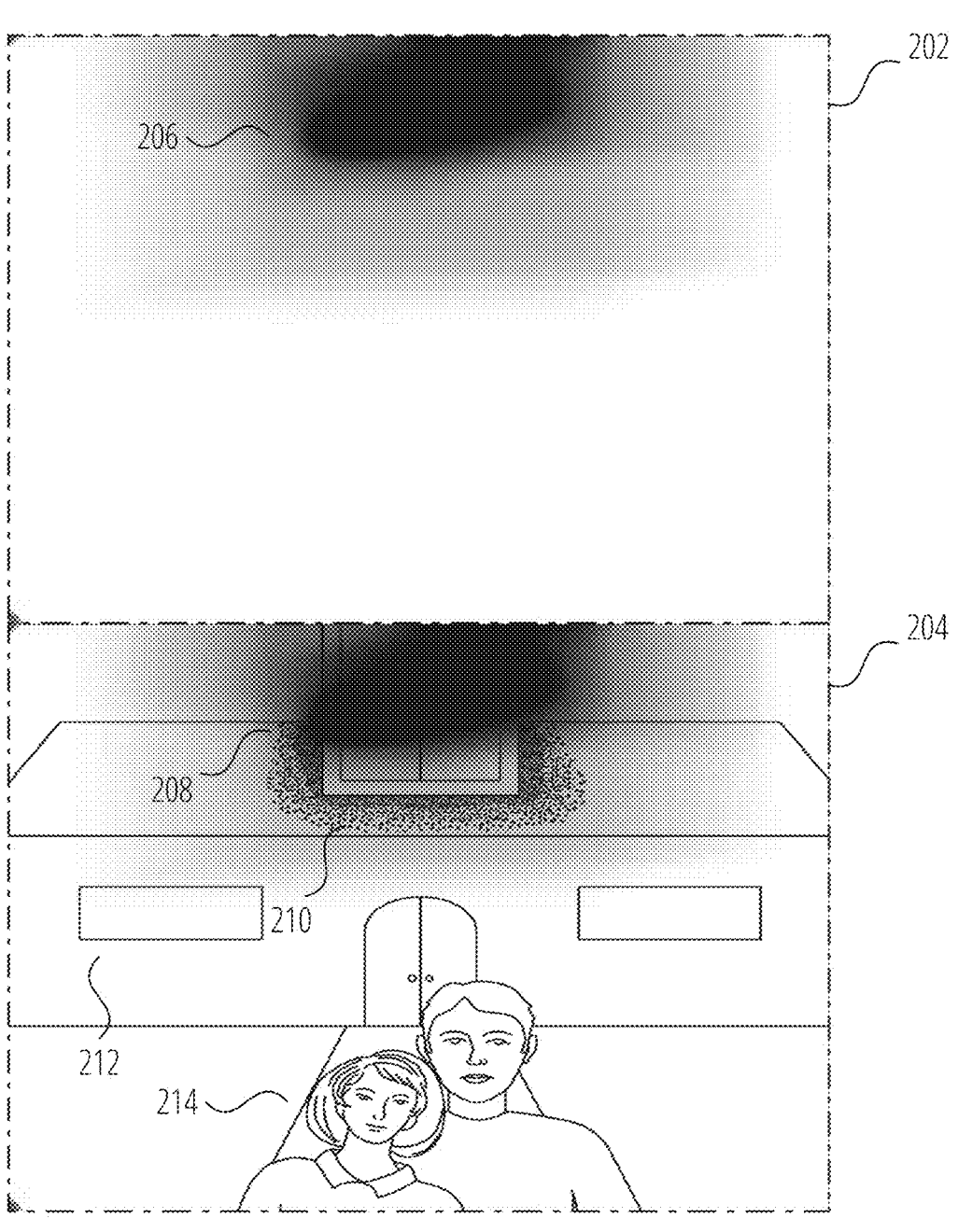
FIG. 2 illustrates an example of training data used to train a delighting model.

Turning to FIG. 2, FIG. 2 illustrates an example of training data used to train the delighting model. As shown in FIG. 2, this example of training data includes two images, an original image and a lighted image. The original image 202 only includes the light source and its emission and does not contain any subjects or background objects (e.g., a location and/or a segmentation of a light source). For example, the light source 206 in the original image 202 is in the center top of the original image 202 and is configured as an oval-like form. The example of the original image 202 discussed herein is merely for example and the light source in the original image 202 can take various shapes, sizes, colors and orientations as well as be placed in various positions on the original image 202. Further, the light source can include a shape of the origination of the light source and ripple impacts of light waves as they emit from the light source.

The lighted image 204 includes various subjects 214 (e.g., people or objects) and various background objects 212 with generated lighting effects corresponding to the light source added onto the original image 202 at a particular location. For example, the lighted image 204 contains a light source 208 in the middle of the top of the lighted image 204 matching the light source 206 in the original image 202, but with lighting effects 210 and emitted light coming from the light source 208 shining onto the background. In some cases, the delighting model completes a depth map assessment to understand where the light source is positioned on the lighted image 204 and how the light source 206 and its corresponding emitted light waves impact the scene of the lighted image 204. For example, the delighting model can complete a depth map assessment on the lighted image 204 where it determines that the light source 208 in the lighted image 204 will have lighting effects 210 on the scene of the lighted image 204.

In some embodiments, the delighting model is trained with the combination of the original image 202, the lighted image 204, and a location or segmentation that identifies the light source as the delighting model analyzes where a possible light source 206 is within in an image (i.e., in the original image 202) and what lighting effect 210 is produced from the light source 206 (i.e., in the lighted image 204). It should be noted that in some embodiments, the light source locations and information may be manually added to provide control for the model training process. However, in other embodiments, automated or random systems may be used to implement light sources. Various examples of original images 202, lighted images 204, and locations or segmentations that identify the light source and/or light impact are used to train the delighting model as to expose the delighting model to various light sources and their corresponding lighting effects 210. In a first example, light effects from the light source are added onto the original image 202 according to the location or segmentation that identifies the light source, while training of the delighting model is occurring. It should be understood that the light effects from the light source (e.g., light reflections and halo lighting) are not differentiated from the light source and are all used to train the delighting model as well as are predicted by the delighting model. In some instances the original image 202 is saved and/or stored for future use in training the delighting model.

Additionally, in some cases, the variety of light sources and various lighting effects enables the delighting model to be more accurate for unique situations with different types of light sources and impacts when using the delighting model to delight the original image.

Figure 3:
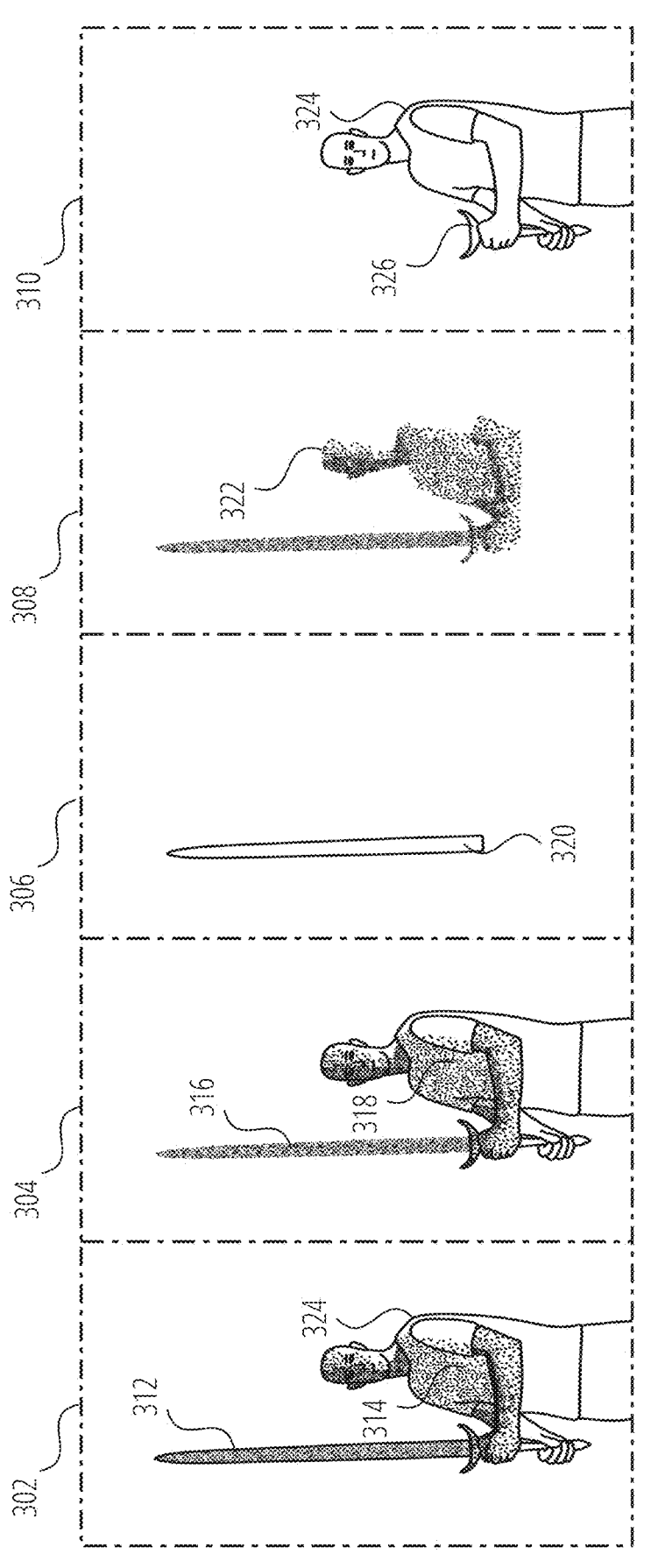
FIG. 3 illustrates an example of a delighting model delighting an image.

Turning to FIG. 3 this figure illustrates an example of a delighting model delighting an image, according to embodiments herein. For example, the delighting model, trained on training data discussed herein, is configured to generate (i.e., predict) a negative light image that can be used to delight an image based on a pre-processed image and an identified perimeter shape of a light source that the user wants delighted.

To begin the process of delighting an image, an original image 302 is received from the user. The original image 302 includes one or more light sources (e.g., a light-up sword 312) emitting light 314 onto the subject 324 and/or background within the original image 302. For example, when the original or first image 302 was captured by a camera a physical light source, e.g., lamp, lights, fireworks, etc. was activated and the image captured the light source and the light waves emitted from the source and reflected by objects and people within the scene.

In some instances, a housing or enclosure of the light source within the original image 302 is identified. The housing of the light source is identified by using, for example, a segmentation analysis that separates pixels that correlate with a light source and their position within the frame is identified. Additionally, various pre-trained models, computer vision or image analysis techniques may be used on the original image 302 to outline the origin of the emitted light, where the housing of the light source includes a geometric outline or perimeter of the light source. For example, the light bulb glass for a lamp is identified as the housing, or a plastic tube for a glow stick is identified as the housing. The housing of the light source is removed from the original image 302 creating a second image 304 that includes only the light source 316 and the emitted light 318 from the light source 316, but the housing or enclosure for the light source is removed. For example, a light-up sword 312 in the original image 302 is identified in pre-processing and the housing removed from the first image leaving only the light source 316 and the emitted light 318 from the light source 316 of the light-up sword 312 as illustrated in second image 304. It should be noted that the enclosure removal process may be omitted in certain instances, such as those without a predefined or close light source (e.g., a background light or enclosure that is positioned out of the captured scene). Embodiments including the enclosure removing process may be included in instances where a lighting effect may be desired to be re-added to the images after the delighting process.

In instances where the enclosure removal operation is completed, a perimeter shape 320 of the light source and/or the representation of the light source are identified within the second image 304. This shape can then be extracted from the image. For example, a third image 306 is generated including the identified perimeter shape 320 of the light source and/or the representation of the light source with other objects such as people, subjects and backgrounds within the third image 306 removed. The third image 306 contains only the perimeter shape 320 of the light source and/or representation of the light source, this can be used to add in the light source and enclosure (albeit with different characteristics for example) after the delighting process is complete. In instances where a light source may not wish to be added back in or other artistic additions may be used, this pre-processing operation may be omitted.

As a specific example, with reference to the third image, segmentation and location information for the light was used to remove the light housing, such as by in-painting or in-filling the inside perimeter of the light housing segmentation of the image. Then, this was used as an input to the model to demonstrate to the model which light source was to be removed, this allowed for the precise update and editing of the light source in the image.

The delighting model trained on original and lighted images as discussed herein is given image 304 and the third image 306 as inputs. Then, the delighting model generates a predicted negative light image 308 with only the light 322 emitted or reflected form the light source of image 304. For example, the generated predicted negative light image 308 has only the light 322 emitted from the light source 316 in image 304 coming from the light-up sword 312 and the light reflected off the subject.

Then, the pixel values of the predicted negative light image 308 is subtracted from the pixel values of the second image 304 removing emitted light from a light-up sword 312. The final output is delighted image 310 representing the same subject 324 as the subject 324 in the original image 302, but holding only the hilt 326 of the light-up sword 312 without a light source or light emitted from the light-up sword 312. More generally, the light source and light emitted from the light source (e.g., illustrated in the predicted negative light image 308) is subtracted from the second image 304 to create a delighted image 310 that has been delighted of light sources. Accordingly, delighted image 310 includes the subject 324, the hilt 326 of the light-up sword 312 and the background of the image delighted but unmodified. Further, delighted image 310 is clear and with no stray lighting effects coming from the removed light source, nor is there any remaining sign of the light-up sword 312. Note that the delighting model also handles color correction for delighted image 310.

In some other embodiments, the original image 302 and the third image 306 can be used as inputs for the delighting model. However, in such embodiments, the predicted negative light image 308 and delighted image 310 include the housing of the light source. For example, if the original image 302 and the third image 306 are given to the delighting model as inputs, the plastic housing of the light-up sword 312 would remain in delighted image 310. However, the plastic housing would not be emitting any light as the delighting model removed the light source and the emitted light from delighted image 310.

In some embodiments, a delighted image 310 can be relighted using a secondary model to add a new light source to the image with the corresponding light effects from the light source. In some such instances, an animated image is generated by the model, where the light effect from the light source includes blinking, movement, or displaying various lighting effects better conveyed in animated digital content. For example, with reference to delighted image 310, a model can add a light source onto the hilt 326 of the light-up sword to visualize a blade of the light-up sword extending from the hilt 326, mimicking the activation of the light-up sword.

Figure 4:
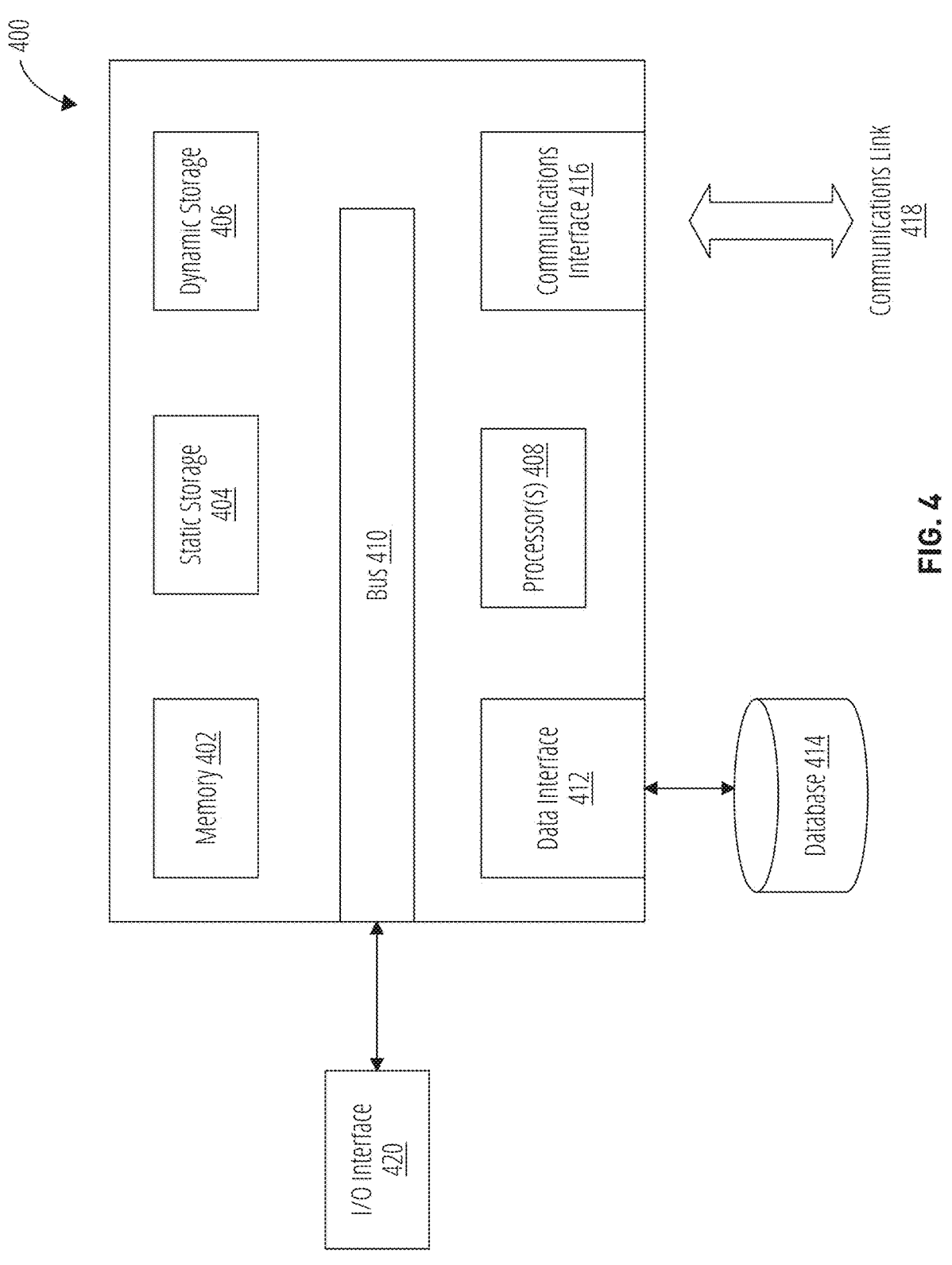
FIG. 4 illustrates an example computing system used in various embodiments and examples of the disclosure.

Turning to FIG. 4, FIG. 4 illustrates an example computing system 400 used for implementing various embodiments in the examples described herein. For example, in various embodiments, the database of training data 102, the server and/or computer for the delighting model 104, and the user device 106 is implemented by one or several computing systems 400. This disclosure contemplates any suitable number of computing systems 400. For example, the a computing system 400 is a server, a desktop computing system, a mainframe, a mesh of computing systems, a laptop or notebook computing system, a tablet computing system, an embedded computer system, a system-on-chip, a single-board computing system, or a combination of two or more of these. Where appropriate, the computing system 400 includes one or more computing systems; be unitary or distributed; span multiple locations; span multiple locations; span multiple machines; span multiple data centers; or reside in a cloud, which includes one or more cloud components in one or more networks.

Computing system 400 includes a bus 410 (e.g., an address bus and a data bus) or other communication mechanism for communicating information, which interconnects subsystems and devices, such as processor 408, memory 402 (e.g., RAM), static storage 404 (e.g., ROM), dynamic storage 406 (e.g., magnetic or optical), communications interface 416 (e.g., modem, Ethernet card, a network interface controller (NIC) or network adapter for communicating with an Ethernet or other wire-based network, a wireless NIC (WNIC) or wireless adapter for communicating with a wireless network, such as a WI-FI network), input/output (I/O) interface 420 (e.g., keyboard, keypad, mouse, microphone). In particular embodiments, the computing system 400 includes one or more of any such components.

In particular embodiments, processor 408 includes hardware for executing instructions, such as those making up a computer program. For example, a processor 408 executes instructions for the server and/or computer for the delighting model 104. The processor 408 circuity includes circuitry for performing various processing functions, such as executing specific software for perform specific calculations or tasks, e.g., a central processing unit, a graphical processing unit (GPU), or two or more types of processing units or controllers. In particular embodiments, I/O interface 420 includes hardware, software, or both, providing one or more interfaces for communication between computing system 400 and one or more I/O devices. Computing system 400 includes one or more of these I/O devices, where appropriate. One or more of these I/O devices enable communication between a person and computing system 400.

In particular embodiments, the communications interface 416 includes hardware, software, or both providing one or more interfaces for communication (such as, for example, packet-based communication) between computing system 400 and one or more other computer systems or one or more networks. One or more memory buses (which can each include an address bus and a data bus) couple processor 408 to memory 402. Bus 410 includes one or more memory buses, as described below. In particular embodiments, one or more memory management units (MMUs) reside between processor 408 and memory 402 and facilitate accesses to memory 402 requested by processor 408. In particular embodiments, bus 410 includes hardware, software, or both coupling components of computing system 400 to each other.

According to particular embodiments, computing system 400 performs specific operations by processor 408 executing one or more sequences of one or more instructions contained in memory 402. For example, instructions for the database of training data 102, the server and/or computer for the delighting model 104, and/or the user device 106 is contained in memory 402 and is executed by the processor 408. Such instructions are read into memory 402 from another computer readable/usable medium, such as static storage 404 or dynamic storage 406. In alternative embodiments, hard-wired circuitry is used in place of or in combination with software instructions. Thus, particular embodiments are not limited to any specific combination of hardware circuitry and/or software. In various embodiments, the term "logic" means any combination of software or hardware that is used to implement all or part of particular embodiments disclosed herein.

The term "computer readable medium" or "computer usable medium" as used herein refers to any medium that participates in providing instructions to processor 408 for execution. Such a medium takes many forms, including but not limited to, nonvolatile media and volatile media. Nonvolatile media includes, for example, optical or magnetic disks, such as static storage 404 or dynamic storage 406. Volatile media includes dynamic memory, such as memory 402.

Computing system 400 transmits and receives messages, data, and instructions, including program, e.g., application code, through communications link 418 and communications interface 416. Received program code is executed by processor 408 (which may include one or more GPUs) as it is received, and/or stored in static storage 404 or dynamic storage 406, or other storage for later execution. A database 414 is used to store data accessible by the computing system 400 by way of data interface 412. For example, database of training data 102 is stored using a database 414. In various examples, communications link 418 communicates with the user device 106 and/or the server and/or computer for the delighting model 104

FIG. 5 illustrates a flowchart of a method 500 for content modification executed by a computer including a processor and a memory according to embodiments herein. The method 500 includes receiving 502 an initial image that includes light emitted from a representation of a light source. For example, the delighting model can receive as an input an original image, such as that captured by a user device 106, where the original or initial image includes light and light effects from a physical light source that was in the environment when the initial image was captured.

The method 500 further includes analyzing 504 the initial image, with a delighting model, to predict a second image comprising the light emitted from the representation of the light source. For example, the delighting model can predict negative light of the initial image including only the light emitted from the light source with no subjects or backgrounds in the scene of the image. Additionally, the delighting model can be trained on an original image and a lighted image as previously discussed herein.

In some embodiments a segmentation model may be used to analyze the various objects within an image to allow a user or a model to select particular objects for light removal. For example, in some embodiments, a segmentation analysis may be performed that groups pixels together that are likely to belong to different objects within a scene, e.g., segments. From there, selected segments can be identified and the delighting model can be applied to only certain segments, rather than to the entire image. By performing a segmentation assessment, more control and precision can be used to remove only certain light sources and effects rather than all lighting sources in an image or scene. In other examples, the delighting model can be holistically to the entire image and removing all light sources and effects. In instances where the segmentation model is used, in some instances a user can select a particular segment for delighting or in other embodiments a separate model can be trained to remove certain types of light sources, e.g., those identified as corresponding to particular noisy or undesirable light sources. For example, for images that are captured in a similar area a particular background light can be identified using the segmentation model and that can be selected as a light source always to be removed, without requiring user input to do so.

The method 500 further includes subtracting 506 pixel values of the predicted second image comprising negative light of the initial image from pixel values of the initial image. For example, hue, brightness, and other pixel value information for the image may be subtracted or otherwise compared against the second or negative light image to remove the light source and light effects from the original image. That is, by subtracting the contributions of the light from the original image, the resulting image may be a delighted version of the original image.

The method 500 further includes outputting 508 a third image comprising the initial image without the emitted light from the representation of the light source. For example, the delighted image with the original content, but with the source and effects from any light sources may be provided to the user device 106, e.g., halo effects, stray light, lens flare, and other light impact from the light source on the original scene captured by the initial image may be removed, such that the delighted image may include hue, brightness, and content that is representative of the scene as if the light source was not present. It should be noted that because of the emitted light, the colors may be "changed" from the original image, but the change is to remove the coloring modifications that were due to the light waves reflected.

In some embodiments of the method 500, the initial image includes light emitted from one or more representations of light sources. That is, the process may be run a single time, but identify light from multiple light sources all of which may impact the overall content of the image (e.g., using a whole white image to delight the whole image of light effects from the corresponding multiple light sources). In other embodiments, the process may be run iteratively to remove light sources and their respective effects one at a time (e.g., using segmentations to identify light sources and the corresponding light effects to be removed).

In some embodiments, the method 500 may additionally include an enclosure operation. For example, the computer system may be configured to identify a perimeter shape of the representation of the light source in the initial image. For example, a housing or enclosure of the light source may be identified by using computer vision or image analysis techniques. In these instances, the method 500 may also include modifying the original image to remove a housing of the representation of the light source, leaving light emitted from the representation of the light source, and using the modified original image as an input in the delighting model in place of the initial image.

Figure 6:
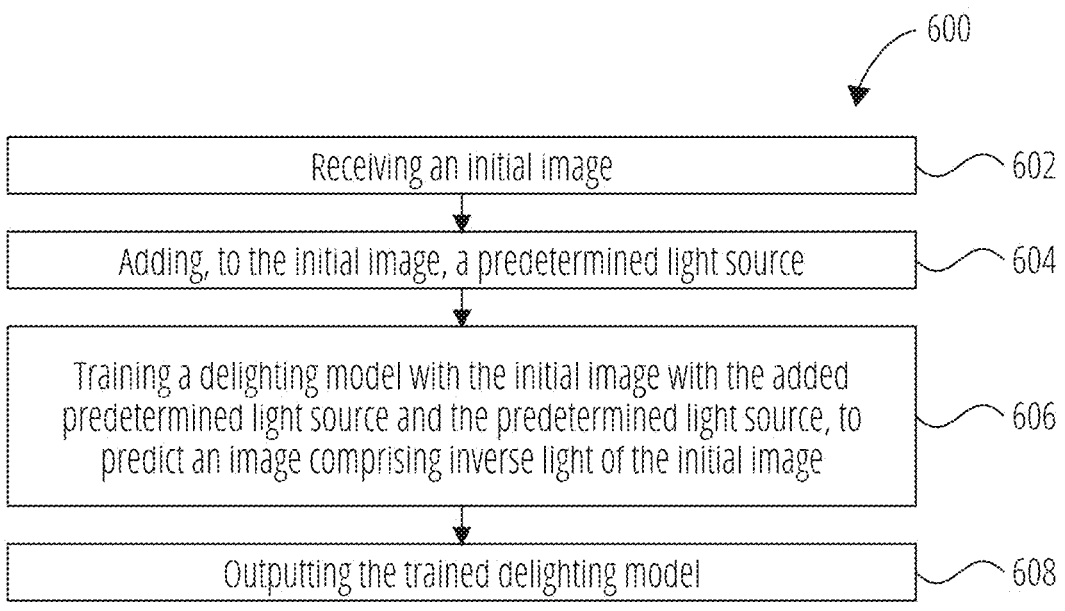
FIG. 6 illustrates a flowchart of a method for content modification.

FIG. 6 illustrates a flowchart of a method 600 for content modification executed by a computer including a processor and a memory, according to embodiments herein. The method 600 includes receiving 602 an initial image. For example, the delighting model can receive an initial image used for training, such as that captured by a user device 106 or stored in a server or computer. The initial or original image includes a variety subjects and backgrounds within the scene of the initial image as to expose the delighting model to various initial images during training.

The method 600 further includes adding 604, to the initial image, a predetermined light source. For example, the predetermined light source emits light waves and light effects onto the scene of the initial image, e.g., halo effects, stray light, lens flare, and other light impact from the light source on the scene of the initial image. It should be noted that because of the emitted light, the colors may be "changed" from the initial image, but the change is to add the coloring modifications that were due to the emitted light waves.

The method 600 further includes training 606 a delighting model with the initial image with the added predetermined light source and the predetermined light source (e.g., which may be identified via a segmentation model or assessment that identifies the shape and location of a light source), to predict an image comprising negative light of the initial image. For example, the delighting model can complete a depth map assessment to understand where the predetermined light source is positioned on the initial image and how the predetermined light source and its corresponding emitted light waves impact the scene of the initial image.

The method 600 further includes outputting 608 the trained delighting model. For example, the trained delighting model can stored on a computer or server to delight received images from a user device 106. The delighting model, for example, removes light and effects from any light sources e.g., halo effects, stray light, lens flares, and other light impact from the light source on the original scene captured by an image received from the user device 106.

In some embodiments of the method 600, the delighting model is trained with one or more initial images. That is the training process can be repeated using various initial images and a variety of predetermined light sources as to increase its accuracy and robustness of the delighting model. In other embodiments, the training process may be run a single time but using multiple initial images and predetermined light sources. In some cases, the initial image used for training can include no predetermined light sources in the image.

In some instances, the delighting model is generated using an unsupervised process. In such instances, the delighting mode is trained on data fed to the model.

The description of certain embodiments included herein is merely exemplary in nature and is in no way intended to limit the scope of the disclosure or its applications or uses. In the included detailed description of embodiments of the present systems and methods, reference is made to the accompanying drawings which form a part hereof, and which are shown by way of illustration specific to embodiments in which the described systems and methods may be practiced. These embodiments are described in sufficient detail to enable those skilled in the art to practice presently disclosed systems and methods, and it is to be understood that other embodiments may be utilized, and that structural and logical changes may be made without departing from the spirit and scope of the disclosure. Moreover, for the purpose of clarity, detailed descriptions of certain features will not be discussed when they would be apparent to those with skill in the art so as not to obscure the description of embodiments of the disclosure. The included detailed description is therefore not to be taken in a limiting sense, and the scope of the disclosure is defined only by the appended claims.

From the foregoing it will be appreciated that, although specific embodiments of the invention have been described herein for purposes of illustration, various modifications may be made without deviating from the spirit and scope of the invention.

The particulars shown herein are by way of example and for purposes of illustrative discussion of the preferred embodiments of the present invention only and are presented in the cause of providing what is believed to be the most useful and readily understood description of the principles and conceptual aspects of various embodiments of the invention. In this regard, no attempt is made to show structural details of the invention in more detail than is necessary for the fundamental understanding of the invention, the description taken with the drawings and/or examples making apparent to those skilled in the art how the several forms of the invention may be embodied in practice.

As used herein and unless otherwise indicated, the terms "a" and "an" are taken to mean "one", "at least one" or "one or more". Unless otherwise required by context, singular terms used herein shall include pluralities and plural terms shall include the singular.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to". Words using the singular or plural number also include the plural and singular number, respectively. Additionally, the words "herein," "above," and "below" and words of similar import, when used in this application, shall refer to this application as a whole and not to any particular portions of the application.

Of course, it is to be appreciated that any one of the examples, embodiments or processes described herein may be combined with one or more other examples, embodiments and/or processes or be separated and/or performed amongst separate devices or device portions in accordance with the present systems, devices and methods.

Finally, the above discussion is intended to be merely illustrative of the present system and should not be construed as limiting the appended claims to any particular embodiment or group of embodiments. Thus, while the present system has been described in particular detail with reference to exemplary embodiments, it should also be appreciated that numerous modifications and alternative embodiments may be devised by those having ordinary skill in the art without departing from the broader and intended spirit and scope of the present system as set forth in the claims that follow. Accordingly, the specification and drawings are to be regarded in an illustrative manner and are not intended to limit the scope of the appended claims.

The invention claimed is:

1. A method for content modification executed by a computer including a processor and a memory comprising:
   receiving an initial image, wherein the initial image includes light emitted from a representation of a light source;
   identifying a perimeter of the representation of the light source;
   modifying the initial image to remove the perimeter of the representation of the light source to generate a modified initial image;
   analyzing the modified initial image, with a delighting model, to predict a second image comprising the light emitted from the representation of the light source;
   subtracting pixel values of the predicted second image from pixel values of the modified initial image; and
   outputting a third image comprising the modified initial image without the emitted light from the representation of the light source.

2. The method of claim 1, wherein the initial image includes light emitted from a plurality of representations of light sources.

3. The method of claim 1, further comprising identifying a shape of the perimeter of the representation of the light source in the initial image.

4. The method of claim 1, wherein the delighting model is trained using training data comprising a predetermined light source and an image with the predetermined light source added to it.

5. The method of claim 1, wherein the delighting model predicts the second image based on an identified shape of the perimeter of the representation of the light source and the initial image as inputs.

6. The method of claim 1, further comprising using the delighting model to predict negative light of one or more stray light sources within the initial image including a halo effect.

7. The method of claim 1, further comprising using the delighting model to predict negative light of one or more lens effects within the initial image including a lens flare.

8. The method of claim 1, further comprising using the delighting model to add one or more new representations of light sources and corresponding emitted light from the one or more new representations of the light sources to the outputted third image.

9. The method of claim 8, further comprising using the delighting model to generate an animated image with one or more animated representations of light sources.

10. The method of claim 1, further comprising identifying the representation of the light source within the initial image, wherein the initial image comprises one or more light sources.

11. A method for content modification executed by a computer including a processor and a memory comprising:

receiving an initial image, wherein the initial image includes light emitted from a representation of a light source;

modifying the initial image to remove a housing of the representation of the light source, leaving light emitted from the representation of the light source;

using the modified initial image as an input in a delighting model in place of the initial image;

analyzing the modified initial image, with the delighting model, to predict a second image comprising the light emitted from the representation of the light source;

subtracting pixel values of the predicted second image from pixel values of the modified initial image; and outputting a third image comprising the modified initial image without the emitted light from the representation of the light source.

12. A method for content modification executed by a computer including a processor and a memory comprising:

receiving an initial image;

adding, to the initial image, a predetermined light source;

identifying a perimeter of the predetermined light source;

modifying the initial image to remove the perimeter of the predetermined light source to generate a modified initial image; and training a delighting model to predict a negative light image comprising only light emitted from a light source.

13. The method of claim 12, wherein the delighting model is trained with a plurality of initial images.

14. The method of claim 12, wherein a plurality of predetermined light sources are added to the initial image.

15. The method of claim 12, further comprising generating a segmentation of the predetermined light source, wherein the segmentation of the predetermined light source is used to further train the delighting model.

16. The method of claim 12, wherein the initial image comprises background lighting effects.

17. The method of claim 12, wherein the predetermined light source comprises one or more lens effects including a lens flare.

18. The method of claim 12, wherein the predetermined light source comprises one or more halo effects.

19. The method of claim 12, further comprising generating a new predetermined light source, wherein adding the new predetermined light source to the initial image occurs during the training of the delighting model.

20. The method of claim 12, further comprising identifying a shape of the perimeter and a location of the perimeter of the predetermined light source using a segmentation model.

* * * * *